United States Patent
Min et al.

(10) Patent No.: US 12,126,008 B2
(45) Date of Patent: Oct. 22, 2024

(54) MULTI-LAYER ELECTRODE HAVING PLURAL ACTIVE MATERIAL LAYERS INCLUDING BINDERS WITH DIFFERENT ELASTIC RECOVERY RATES AND UNIFORM POROSITY AND LITHIUM SECONDARY BATTERY INCLUDING THE SAME

(71) Applicant: LG Energy Solution, Ltd., Seoul (KR)

(72) Inventors: Jiwon Min, Daejeon (KR); Sun Kyu Kim, Daejeon (KR); Kyung Eun Sun, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 782 days.

(21) Appl. No.: 17/054,576

(22) PCT Filed: Aug. 30, 2019

(86) PCT No.: PCT/KR2019/011193
§ 371 (c)(1),
(2) Date: Nov. 11, 2020

(87) PCT Pub. No.: WO2020/080671
PCT Pub. Date: Apr. 23, 2020

(65) Prior Publication Data
US 2021/0104731 A1   Apr. 8, 2021

(30) Foreign Application Priority Data
Oct. 18, 2018 (KR) .................. 10-2018-0124558

(51) Int. Cl.
| H01M 4/139 | (2010.01) |
| H01M 4/02 | (2006.01) |
| H01M 4/04 | (2006.01) |
| H01M 4/36 | (2006.01) |
| H01M 4/62 | (2006.01) |
| H01M 10/0525 | (2010.01) |

(52) U.S. Cl.
CPC ......... *H01M 4/139* (2013.01); *H01M 4/0404* (2013.01); *H01M 4/0435* (2013.01); *H01M 4/366* (2013.01); *H01M 4/621* (2013.01); *H01M 4/625* (2013.01); *H01M 10/0525* (2013.01); *H01M 2004/021* (2013.01)

(58) Field of Classification Search
CPC .. H01M 4/139; H01M 4/0404; H01M 4/0435; H01M 4/366; H01M 4/621; H01M 4/625
USPC .................. 429/209, 217, 232, 233
See application file for complete search history.

(56) References Cited

U.S. PATENT DOCUMENTS

| 8,951,669 B2 | 2/2015 | Lee et al. | |
| 10,008,716 B2 | 6/2018 | Abdelsalam et al. | |
| 10,608,247 B2 | 3/2020 | Park et al. | |
| 2011/0189541 A1 | 8/2011 | Kitagawa et al. | |
| 2011/0223456 A1* | 9/2011 | Sugaya | H01M 4/13 29/623.5 |
| 2016/0190593 A1* | 6/2016 | Nomura | H01M 4/1391 429/231.1 |
| 2018/0219217 A1* | 8/2018 | Park | H01M 4/133 |
| 2019/0027740 A1 | 1/2019 | Lee et al. | |
| 2019/0305308 A1 | 10/2019 | Lee et al. | |
| 2023/0238519 A1* | 7/2023 | Zhang | H01M 4/622 429/209 |

FOREIGN PATENT DOCUMENTS

| CN | 113692654 A * | 11/2021 | ........ H01M 10/0525 |
| JP | 2008-258055 A | 10/2008 | |
| JP | 2009-224239 A | 10/2009 | |
| JP | 2015-537347 A | 12/2015 | |
| JP | 6015222 B2 | 10/2016 | |
| KR | 10-2014-0137660 A | 12/2014 | |
| KR | 10-2015-0014397 A | 2/2015 | |
| KR | 10-2015-0014800 A | 2/2015 | |
| KR | 2015014800 A * | 2/2015 | |
| KR | 10-2015-0032273 A | 3/2015 | |
| KR | 10-2017-0111725 A | 10/2017 | |
| KR | 10-2017-0111743 A | 10/2017 | |
| KR | 10-2018-0035693 A | 4/2018 | |
| KR | 10-2018-0040268 A | 4/2018 | |
| WO | WO-2017171409 A1 * | 10/2017 | ........ H01M 10/0525 |

OTHER PUBLICATIONS

Extended European Search Report issued by the European Patent Office dated May 19, 2021 in a corresponding European Patent Application No. 19872316.5.
International Search Report (with partial translation) and Written Opinion issued in corresponding International Patent Application No. PCT/KR2019/011193, dated Dec. 12, 2019.

* cited by examiner

*Primary Examiner* — Sean P Cullen
(74) *Attorney, Agent, or Firm* — Bryan Cave Leighton Paisner LLP

(57) ABSTRACT

The present disclosure relates to a multi-layer electrode including a current collector; and a multi-layer electrode material layer comprising n active material layers (wherein, n≥2) formed on at least one surface of the current collector, wherein each of the active material layers contains an electrode active material and a binder, the binders in the respective active material layers are different from each other, and the multi-layer electrode material layer has a uniform porosity from first active material layer closest to the current collector to $n^{th}$ active material layer furthest from the current collector. The present disclosure also relates to a lithium secondary battery including the same.

12 Claims, No Drawings

MULTI-LAYER ELECTRODE HAVING PLURAL ACTIVE MATERIAL LAYERS INCLUDING BINDERS WITH DIFFERENT ELASTIC RECOVERY RATES AND UNIFORM POROSITY AND LITHIUM SECONDARY BATTERY INCLUDING THE SAME

CROSS-REFERENCE TO RELATED APPLICATION

This application claims the benefits of Korean Patent Application No. 10-2018-0124558 filed on Oct. 18, 2018 with the Korean Intellectual Property Office, the disclosure of which is incorporated herein by reference in its entirety.

The present disclosure relates to a multi-layer electrode having uniform porosity, and a lithium secondary battery including the same.

TECHNICAL FIELD

Background of Art

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

In addition, increased interest in environmental issues has brought a great deal of researches associated with electric vehicles (EVs) and hybrid electric vehicles (HEVs) as substitutes for vehicles using fossil fuels such as gasoline vehicles and diesel vehicles which are main factors of air pollution. As a power source of such electric vehicles (EVs) and hybrid electric vehicles (HEVs), lithium secondary batteries having high energy density, high discharge voltage and output stability have been mainly studied and used.

This lithium secondary battery is being developed as a model capable of realizing high voltage and high capacity according to consumer requirements, and an optimization process of a cathode material, an anode material, a separator, and an electrolytic solution, which are four components of the lithium secondary battery, is required in a limited space in order to have high capacity.

Meanwhile, with the development of the secondary batteries, recently, electrodes having a multi-layer structure in which the active material layer is not a single layer, but more than two layers have been developed for various reasons.

For example, in order to solve a problem in which a binder or a conductive material is detached during a drying process, to improve charge/discharge characteristics, lifespan characteristics, and the like, or to exhibit the most desirable secondary battery performance when using different active materials, the multi-layer electrode is used.

Since the multi-layer electrode is prepared by coating each active material layer and then rolling, the porosity of the final electrode can be designed and realized. However, it is difficult to control the porosity of each active material layer, and the degree of pressure applied is different, so that there is a problem in that the porosities of the respective layers are different.

Therefore, there is a high necessity for developing an electrode for secondary batteries having an overall uniform porosity even in a multi-layer electrode by solving the above-described problem.

DETAILED DESCRIPTION OF THE INVENTION

Technical Problem

The present invention has been made to solve the above problems and other technical problems that have yet to be resolved.

The present disclosure is to provide an electrode having a multi-layer structure in which an electrode material layer including n active material layers has an overall uniform porosity by applying a binder having different physical properties to each active material layer.

Technical Solution

According to an embodiment of the present disclosure, there is provided a multi-layer electrode including a current collector; and a multi-layer electrode material layer comprising n active material layers (wherein, n≥2) formed on at least one surface of the current collector, wherein each of the active material layers contains an electrode active material and a binder, the binders in the respective active material layers are different from each other, and the multi-layer electrode material layer has a uniform porosity from first active material layer closest to the current collector to $n^{th}$ active material layer furthest from the current collector.

According to another embodiment of the present disclosure, there is provided a preparation method of the multi-layer electrode including the steps of:

(a) determining a total porosity of an electrode material layer;

(b) selecting n binders (wherein, n≥2) having different elastic recovery rates in consideration of the total porosity of the electrode material layer;

(c) mixing the binders with an electrode active material to prepare n slurries, wherein the binders are selected so that the elastic recovery rate of the binder is sequentially increased from a first slurry constituting a first active material layer closest to a current collector to a $n^{th}$ slurry constituting a $n^{th}$ active material layer farthest from the current collector; and (d) sequentially applying the slurries from the first to the $n^{th}$ to the current collector, drying, and then rolling to form an electrode material layer, wherein the electrode material layer has a uniform porosity from the first active material layer to the $n^{th}$ active material layer.

According to another embodiment of the present disclosure, there are provided a lithium secondary battery including the multi-layer electrode and a device including the lithium secondary battery as a power source.

DETAILED DESCRIPTION OF THE EMBODIMENTS

According to an embodiment of the present disclosure, there is provided a multi-layer electrode including a current collector; and a multi-layer electrode material layer comprising n active material layers (wherein, n≥2) formed on at least one surface of the current collector, wherein each of the active material layers contains an electrode active material and a binder, the binders in the respective active material layers are different from each other, and the multi-layer electrode material layer has a uniform porosity from first active material layer closest to the current collector to $n^{th}$ active material layer furthest from the current collector.

That is, conventionally, the same pressure was applied to the entire active material layer in the rolling process when manufacturing a multi-layer electrode, so that the final porosity could be designed. However, since high pressure was applied to the $n^{th}$ active material layer close to a rolling material and low pressure was applied to the first active material layer far from a rolling material, the porosity decreased from the first active material layer to the $n^{th}$ active material layer and the porosities of the respective active material layers were inevitably different from each other.

If drying and rolling are separately performed in the process of applying each active material layer in order to solve the problem, the drying and rolling should be performed for each step, thereby reducing process efficiency. In addition, since the active material layer closer to the current collector is exposed to a greater number of rolling processes, a rolling pressure should be determined in consideration of the number of times, and thus, a very complicated and difficult calculation should be performed.

Accordingly, the present inventors have confirmed that when each active material layer contains an appropriate binder having a different elastic recovery rate, the entire electrode material layer including the active material layers may have a uniform porosity even after applying all of the multi-layer active material layers, followed by drying and rolling. This is because the binder may control the degree of rolling of each active material layer.

In addition, when each active material layer has a uniform porosity and the porosity is uniform as a whole, it could be confirmed that overall performance such as output characteristics of the secondary battery is improved, thereby completing the present invention.

Herein, the porosity may be 20% to 50%, that is, the porosity of each active material layer from the first active material layer to the $n^{th}$ active material layer may be 20% to 50%, specifically 20% to 30%. Therefore, the porosity of the entire electrode material layer may also be in the above range, and a total porosity of the electrode material layer and the porosity of each active material layer are almost equal.

As used herein, the term "uniform" means that the difference is within 2%, more specifically within 1%, and the difference in porosity between the active material layers is very small.

The porosity may be measured by SEM analysis. Specifically, it may be obtained by a method of quantifying a pore distribution in the thickness direction of electrode as follows: Before analysis, the electrode is filled with epoxy and dried in vacuum to prepare analytical samples. It is divided into 9 parts so as to have the same space in plan view, and the electrode active material layer sample is cut by ion milling in the thickness direction along the 9 equally divided straight line. Each cross section is photographed by SEM (10 kV), and an area ratio of pores with respect to a total cross-sectional area is computed from the SEM image of each cross section. An average value of the 9 area ratios of pores is defined as the porosity value of the electrode active material layer.

Meanwhile, as described above, when rolling is performed in the rolling process, the $n^{th}$ active material layer close to the rolling material is subjected to the strongest pressure because the pressure is applied as it is, and the first active material layer far from the rolling material is subjected to relatively less pressure inversely proportional to the distance. Therefore, the binder contained in each active material layer may have a higher elastic recovery rate from the first active material layer closest to the current collector to the $n^{th}$ active material layer furthest from the current collector.

That is, the binder having a high elastic recovery rate can resist pressure. Therefore, a material having a low elastic recovery rate is contained in the first active material layer to which the pressure is applied the least, and a material having a high elastic recovery rate is contained in the $n^{th}$ active material layer to which the pressure is applied the most, so that the rolling pressures applied to the respective active material layers may be adjusted to be almost the same to obtain an overall uniform porosity.

Herein, in adjacent active material layers out of the respective active material layers, the elastic recovery rate of the binder of the active material layer farther from the current collector may be 5% to 30%, specifically 5% to 10% greater than the elastic recovery rate of the binder of the active material layer closer to the current collector.

That is, the difference in elastic recovery rate between the binders of the respective layers obtained according to the present disclosure may be within the above range.

Specifically, the elastic recovery rate of the binder contained in the first active material layer may be 5 to 10%, and the elastic recovery rate of the binder contained in the $n^{th}$ active material layer may be 10 to 15% in a range larger than the elastic recovery rate of the binder contained in the first active material layer.

When the overall elastic recovery rate of the binder is too large out of the above range, the porosity may become too high to easily break the electrode, or conductive paths may not be connected well. When it is too small, the porosity may become too low due to rolling and insertion and desorption of lithium ions may not be smooth, which is not preferable.

The difference may be appropriately selected within the above range in consideration of the number of layers of the electrode material layer, the pressure of the rolling process, the thickness of each active material layer, the thickness of the entire electrode material layer, and the like.

However, when the difference is too small out of the above range, it is difficult to obtain a uniform porosity intended by the present disclosure. On the contrary, when the difference is too large, the porosity may vary, and there are almost no binders having the difference in physical property larger than the above range.

The binder contained in each active material layer may be selected in consideration of the porosity of the entire electrode material layer.

For example, the binder may be selected from the group consisting of polyvinylidene fluoride (PVdF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, and fluorine rubber. Considering the elastic recovery rate of the binders, an appropriate binder may be contained in each active material layer.

Herein, the elastic recovery rate of the binder is measured as follows. A solution obtained by dissolving a binder in a solvent, NMP or water, is applied to a polyolefin substrate with a thickness of 50 μm and dried. It is pressurized by a constant pressure so as to have a thickness of 25 μm, and a thickness immediately after removing the pressure and a thickness after 1 minute or more are measured. The elastic recovery rate is expressed as a percentage by calculating a degree of change in thickness with an equation of (thickness after time/thickness immediately after rolling)*100−100.

In addition, the binder may be added to each active material layer in an amount of 1 to 30 wt %, specifically 1 to 10 wt %, and more specifically 1 to 5 wt %, based on a total weight of the active material layer.

Meanwhile, the electrode active material contained in each active material layer is determined according to whether the multi-layer electrode is cathode or anode. In case of cathode, the electrode active material may include, for example, a layered compound such as lithium cobalt oxide ($LiCoO_2$), lithium nickel oxide ($LiNiO_2$), or a compound substituted with one or more transition metals; lithium manganese oxide such as $Li_{1+x}Mn_{2-x}O_4$ (wherein, x is 0~0.33), $LiMnO_3$, $LiMn_2O_3$, and $LiMnO_2$; lithium copper oxide such as $Li_2CuO_2$; vanadium oxide such as $LiV_3O_8$, $LiV_3O_4$, $V_2O_5$, and $Cu_2V_2O_7$; Ni-site type lithium nickel oxide such as $LiNi_{1-x}M_xO_2$ (wherein, M is Co, Mn, Al, Cu, Fe, Mg, B, or Ga, x is 0.01 to 0.3); lithium manganese composite oxide such as $LiMn_{2-x}M_xO_2$ (wherein, M is Co, Ni, Fe, Cr, Zn, or Ta, x is 0.01 to 0.1), and $Li_2Mn_3MO_8$ (wherein, M is Fe, Co, Ni, Cu, or Zn); spinel-structured lithium manganese composite oxide such as $LiNi_xMn_{2-x}O_4$; $LiMn_2O_4$ in which a part of Li is substituted with an alkaline earth metal ion; disulfide compound; $Fe_2(MoO_4)_3$; and the like as a cathode active material. However, the present disclosure is not limited thereto.

In case of anode, the electrode active material may include, for example, a carbon-based material such as crystalline artificial graphite, crystalline natural graphite, amorphous hard carbon, low crystalline soft carbon, carbon black, acetylene black, Ketjenblack®, Super P®, graphene, and fibrous carbon; a Si-based material; metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me:Mn, Fe, Pb, Ge; Me':Al, B, P, Si, a Group 1, Group 2 or Group 3 element of periodic table, halogen; $0 < x \leq 1$; $1 \leq y \leq 3$; $1 \leq z \leq 8$); lithium metal; lithium alloy; silicon-based alloy; tin-based alloy; metal oxide such as SiO, $SiO_2$, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; a Li—Co—Ni-based material; titanium oxide; lithium titanium oxide, and the like as an anode active material. However, the present disclosure is not limited thereto.

Each active material layer of the present disclosure may further contain a conductive material and/or a filler in addition to the electrode active material and the binder.

The conductive material may be contained in an amount of 1 to 30 wt %, specifically 1 to 10 wt %, and more specifically 1 to 5 wt % based on a total weight of the active material layer in each active material layer. The conductive material is not particularly limited, as long as it has electrical conductivity without causing chemical changes in the battery. Examples of the conductive material include carbon blacks such as carbon black, acetylene black, Ketjenblack®, channel black, furnace black, lamp black and thermal black; conductive fibers such as carbon fiber and metallic fiber; metallic powders such as carbon fluoride powder, aluminum powder and nickel powder; conductive whiskers such as zinc oxide and potassium titanate; conductive metal oxides such as titanium oxide; polyphenylene derivatives; and the like.

The filler is optionally used as a component to inhibit expansion of the electrode, and may be added within 5 wt % in each active material layer. The filler is not particularly limited as long as it is a fibrous material that does not cause chemical changes in the battery. For example, olefin-based polymers such as polyethylene and polypropylene; and fibrous materials such as glass fiber and carbon fiber may be used.

The current collector may generally be formed to have a thickness of 3 to 500 μm. The current collector is not particularly limited as long as it has electrical conductivity without causing chemical changes in the battery. For example, it may be copper; stainless steel; aluminum; nickel; titan; sintered carbon; copper, aluminum or stainless steel surface-treated with carbon, nickel, titan or silver; an aluminum-cadmium alloy; or the like. Further, the current collector may form fine irregularities on its surface to increase adhesive force of the electrode active material, and various forms such as a film, a sheet, a foil, a net, a porous body, a foam body, and a nonwoven fabric body may be used.

Meanwhile, the thicknesses of the n active material layers are not limited, and may be different from each other, may be the same, may be partly the same, or may be partly different. The thickness may be appropriately selected depending on the desired performance of secondary battery, the type of active material included, and the like.

According to another embodiment of the present disclosure, there is provided a preparation method of the multi-layer electrode including the steps of:

(a) determining a total porosity of an electrode material layer;

(b) selecting n binders (wherein, $n \geq 2$) having different elastic recovery rates in consideration of the total porosity of the electrode material layer;

(c) mixing the binders with an electrode active material to prepare n slurries, wherein the binders are selected so that the elastic recovery rate of the binder is sequentially increased from a first slurry constituting a first active material layer closest to a current collector to a $n^{th}$ slurry constituting a $n^{th}$ active material layer farthest from the current collector; and (d) sequentially applying the slurries from the first to the $n^{th}$ to the current collector, drying, and then rolling to form an electrode material layer, wherein the electrode material layer has a uniform porosity from the first active material layer to the $n^{th}$ active material layer.

As described above, the binder contained in each active material layer may be selected in consideration of the total porosity of the electrode material layer, the thickness of each active material layer, the pressure of the rolling process, and the like.

Therefore, the total porosity of the electrode material layer is first determined, and then the binders to be contained in the respective n active material layers may be appropriately selected in consideration of the total porosity together with the pressure of the rolling process.

The n binders may have different elastic recovery rates. As described above, the binder contained in each active material layer may have a higher elastic recovery rate from first active material layer to which the pressure is applied the least to the $n^{th}$ active material layer to which the pressure is applied the most, whereby each active material layer may have a uniform porosity to meet the porosity of the entire electrode material layer.

Meanwhile, each slurry is prepared by dispersing the binder thus selected and the electrode active material in a solvent, wherein each slurry may further contain a conductive material and/or a filler.

The description of the conductive material and the filler is as described above.

According to another embodiment of the present disclosure, there is also provided a lithium secondary battery including the multi-layer electrode.

The lithium secondary battery has a structure in which a lithium salt-containing non-aqueous electrolyte is impregnated into an electrode assembly including the multi-layer electrode, an anode when the multi-layer electrode is a cathode or a cathode when the multi-layer electrode is an anode, and a separator.

Of course, both the cathode and the anode may be a multi-layer electrode.

The separator may be an insulating thin film having high ion permeability and mechanical strength. The pore diameter of the separator may suitably range from 0.01 to 10 μm and the thickness may suitably range from 5 to 300 μm. The separator may suitably include a sheet or a nonwoven fabric made of an olefin-based polymer such as polypropylene, which is chemically resistant and hydrophobic, glass fiber, polyethylene, or the like. When a solid electrolyte such as a polymer is used as the electrolyte, the solid electrolyte may also serve as a separator.

The lithium salt-containing non-aqueous electrolyte is composed of a non-aqueous electrolyte and lithium salt, and examples of the non-aqueous electrolyte include a non-aqueous organic solvent, an organic solid electrolyte, an inorganic solid electrolyte, and the like, but are not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte include nitrides, halides and sulfates of lithium (Li) such as $Li_3N$, LiI, $Li_5NI_2$, $Li_3Ni-LiT-LiOH$, $LiSiO_4$, $LiSiO_4$-LiT-LiOH, $Li_2SiS_3$, $Li_4SiO_4$, $Li_4SiO_4$-LiT-LiOH, $Li_3PO_4-Li_2S-SiS_2$ and the like.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH3SO_3Li$, $(CF_3SO_2)_2NLi$, chloroborane lithium, lower aliphatic carboxylic acid lithium, lithium tetraphenyl borate, lithium imide, and the like.

The lithium salt-containing non-aqueous electrolyte may include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, in order to improve charge-discharge characteristics and flame retardancy, and the like. In some cases, a halogen-containing solvent such as carbon tetrachloride and ethylene trifluoride may be further added to give nonflammability, or carbon dioxide gas may be further added to improve high-temperature storage characteristics. FEC (Fluoro-Ethylene Carbonate), PRS (Propene sultone), and the like may be further added thereto.

In one specific example, the lithium salt such as $LiPF_6$, $LiClO_4$, $LiBF_4$, $LiN(SO_2CF_3)_2$, and the like may be added to a mixed solvent of a cyclic carbonate such as EC and PC, which is a high-dielectric solvent, and a linear carbonate such as DEC, DMC and EMC, which is a low-viscosity solvent, to prepare an electrolyte.

According to another embodiment of the present disclosure, there is provided a device including the lithium secondary battery as a power source.

Examples of the device may include electric vehicles such as an electric vehicle (EV), a hybrid electric vehicle (HEV), a plug-in hybrid electric vehicle (PHEV), and a power storage system, but not limited thereto.

Since the structure and manufacturing method of the device are known in the art, detailed description thereof will be omitted herein.

Hereinafter, the present invention will be described in more detail with specific examples. However, these examples are for illustrative purposes only, and the invention is not intended to be limited by these examples.

<Preparation Example>(Examine Binder's Elastic Recovery Rate)

The elastic recovery rate of many binders conventionally used was examined. Of these, five types of binders having the elastic recovery rate of about 5%, 7%, 10%, 12.5%, and 15% were selected and denoted as binders 1 to 5, respectively.

*Elastic recovery rate: A solution obtained by dissolving a binder in NMP solvent is applied to a polyolefin substrate with a thickness of 50 μm and dried. It is pressurized by a constant pressure so as to have a thickness of 25 μm, and a thickness immediately after removing the pressure and a thickness after 5 minutes are measured. The elastic recovery rate may be expressed as a percentage by calculating a degree of change in thickness with an equation of (thickness after time/thickness immediately after rolling)*100−100.

Example 1

1-1. Preparation of First Anode Slurry

The binder 1 (elastic recovery rate: 5%) was used and natural graphite was used as an anode active material. The anode active material, carbon black (conductive material), and the binder were weighed to be 93.5:1.5:5.0, and then mixed in NMP to prepare a second anode slurry.

1-2. Preparation of Second Anode Slurry

The binder 3 (elastic recovery rate: 10%) was used and natural graphite was used as an anode active material. The anode active material, carbon black (conductive material), and the binder were weighed to be 93.5:1.5:5.0, and then mixed in NMP to prepare a first anode slurry.

1-3. Preparation of Anode

The first anode slurry was coated on a current collector of copper foil with a thickness of 50 μm, and the second anode slurry was coated on the first anode slurry with a thickness of 50 μm and then dried. Thereafter, it was rolled so that a total porosity was 25% (a rolling thickness was calculated using desired density of the anode and actual density of the anode material) to obtain an anode including the first active material layer and the second active material layer.

Example 2

An anode was prepared in the same manner as in Example 1, except that the first and second anode slurries were prepared as follows: The first anode slurry was prepared by using the binder 3 (elastic recovery rate: 10%) and natural graphite as an anode active material. Then, the anode active material, carbon black (conductive material), and the binder were weighed to be 93.5:1.5:5.0, and then mixed in NMP. The second anode slurry was prepared by using the binder 5 (elastic recovery rate: 15%) and natural graphite as an anode active material. Then, the anode active material, carbon black (conductive material), and the binder were weighed to be 93.5:1.5:5.0, and then mixed in NMP.

Comparative Example 1

An anode was prepared in the same manner as in Example 1, except that the binder 2 (elastic recovery rate: 7%) was used for the first and second anode slurries.

Comparative Example 2

An anode was prepared in the same manner as in Example 1, except that the binder 4 (elastic recovery rate: 12.5%) was used for the first and second anode slurries.

Experimental Example 1

Analytical samples were prepared by filling electrode plates of the anodes prepared in Examples 1 and 2 and Comparative Examples 1 and 2 with epoxy, and drying in vacuum. The electrode active material layer was divided into 9 parts so as to have the same space in plan view, and the electrode active material layer sample was cut by ion milling in the thickness direction along the 9 equally divided straight line. The thickness direction cross section of each cut active material layer was photographed by SEM (10 kV), and an area ratio of pores with respect to a total cross-sectional area was computed from the SEM image of each cross section. An average value of the 9 area ratios of pores was defined as the porosity value of the electrode active material layer.

The measurement and calculation results of the porosity are shown in Table 1 below.

TABLE 1

|  | First active material layer (%) | Second active material layer (%) |
| --- | --- | --- |
| Example 1 | 24.4 | 25.6 |
| Example 2 | 25.1 | 25.4 |
| Comparative Example 1 | 22.3 | 26.7 |
| Comparative Example 2 | 23.2 | 26.3 |

Referring to Table 1, according to the present disclosure, a difference in porosity between the first active material layer and the second active material layer is not more than 2%, while the active material layers of Comparative Examples 1 and 2 have a difference in porosity of 3 to 4%.

Experimental Example 2

Battery Performance Test $Li(Ni_{1/3}Co_{1/3}Mn_{1/3})O_2$ as a cathode active material, carbon black, and PVDF were mixed in NMP at 96:2:2 to prepare a cathode slurry. This was coated on a current collector of aluminum foil with a thickness of 100 μm, and then dried. Thereafter, it was rolled so that a total porosity was 25% to obtain a cathode.

Secondary batteries were prepared by sealing with an aluminum pouch. Specifically, a PE separator was interposed between the anode prepared in one of Examples 1 and 2 and Comparative Examples 1 and 2, and the cathode, and an electrolytic solution containing 1M $LiPF_6$ in a solvent (EC:DMC:DEC=1:2:1) was used.

These secondary batteries were subjected to a rate test in a voltage range of 2.5 V to 4.4 V, and were charged and discharged for 50 cycles at 0.33C/0.33C in a voltage range of 2.5 V to 4.4 V to evaluate rate characteristics, capacity retention, and resistance increase rate. The results are shown in Table 2 and Table 3 below.

TABLE 2

|  | 0.1C/0.1C vs. 0.1C/0.1C | 0.5C/0.5C vs. 0.1C/0.1C | 1C/1C vs. 0.1C/0.1C | 2C/2C vs. 0.1C/0.1C |
| --- | --- | --- | --- | --- |
| Example 1 | 100% | 93.4% | 80.9% | 71.9% |
| Example 2 | 100% | 93.5% | 81.3% | 72.8% |
| Comparative Example 1 | 100% | 91.2% | 77.8% | 65.6% |
| Comparative Example 2 | 100% | 92.3% | 76.3% | 64.5% |

TABLE 3

|  | Capacity retention ($50^{th}/1^{st}$) | Resistance increase rate ($50^{th}/1^{st}$) |
| --- | --- | --- |
| Example 1 | 95.5% | 10.2% |
| Example 2 | 96.7% | 9.8% |
| Comparative Example 1 | 85.5% | 15.3% |
| Comparative Example 2 | 88.8% | 14.7% |

Referring to Tables 2 and 3 above, when the electrode according to the present disclosure was used, the porosity of the electrode was generally constant, exhibiting excellent rate characteristics, capacity retention, and low resistance increase rate. On the other hand, it was confirmed that Comparative Examples in which the porosity in the electrode was not uniform had the deteriorated characteristics.

Those skilled in the art will appreciate that various modifications, additions and substitutions are possible, without departing from the scope and spirit of the invention as disclosed in the accompanying claims.

INDUSTRIAL APPLICABILITY

As described above, the multi-layer electrode according to the present disclosure can improve overall battery performance, because the electrode material layer including active material layers has an overall uniform porosity by including a binder having different physical properties in each active material layer to adjust the porosity of all active material layers.

The invention claimed is:

1. A multi-layer electrode, comprising:
a current collector; and
a multi-layer electrode material layer comprising a first active material layer to $n^{th}$ active material layer, wherein n is an integer of 2 or more, formed on at least one surface of the current collector,
wherein each of the first to $n^{th}$ active material layers contains an electrode active material and a binder,
wherein the binder in each of the first to $n^{th}$ active material layers is different from all of the other binders,
wherein the multi-layer electrode material layer has a uniform porosity from the first active material layer closest to the current collector to the $n^{th}$ active material layer furthest from the current collector,
wherein elastic recovery rate of the binder contained in each of the first to $n^{th}$ active material layers increases from the first active material layer to the $n^{th}$ active material layer,
wherein the elastic recovery rate is calculated by Equation 1 after applying a solution containing the binder dissolved in N-Methyl-2-pyrrolidone (NMP) solvent onto a polyolefin substrate with a thickness of 50 μm, followed by drying, and then the dried solution is pressurized under a pressure until the dried solution has a thickness of 25 μm, and then, a thickness (A) of the dried solution immediately after removing the pressure and a thickness (B) of the dried solution 5 minutes later after removing the pressure are measured:

Elastic recovery rate (%)=[(B/A)*100]−100    Equation 1 wherein the binder in one active material layer farther from the current collector has a higher elastic recovery rate than the other active material layer adjacent to the one active material layer and closer to the current collector.

2. The multi-layer electrode of claim 1,
wherein the porosity is 20% to 50%.

3. The multi-layer electrode of claim 1,
wherein the porosity is 20% to 30%.

4. The multi-layer electrode of claim 1,
wherein the binder contained in each active material layer is selected in consideration of the porosity of the entire electrode material layer.

5. The multi-layer electrode of claim 1,
wherein the elastic recovery rate of the binder contained in the first active material layer is 5 to 10%, and the elastic recovery rate of the binder contained in the $n^{th}$ active material layer is 10 to 15% larger than the elastic recovery rate of the binder contained in the first active material layer.

6. The multi-layer electrode of claim 1,
wherein, in two adjacent active material layers among the first to $n^{th}$ active material layers, the elastic recovery rate of the binder of one active material layer farther from the current collector is 5% to 30% greater than the elastic recovery rate of the binder of the other active material layer closer to the current collector.

7. The multi-layer electrode of claim 1,
wherein in two adjacent active material layers among the first to $n^{th}$ active material layers, the elastic recovery rate of the binder of one active material layer farther from the current collector is 5% to 10% greater than the elastic recovery rate of the binder of the other active material layer closer to the current collector.

8. The multi-layer electrode of claim 1,
wherein each of the active material layers further contains a conductive material.

9. The multi-layer electrode of claim 8,
wherein the conductive material is contained in an amount of 1 to 5 wt % based on a total weight of the active material layer in each active material layer.

10. A lithium secondary battery comprising the multi-layer electrode of claim 1.

11. A preparation method of the multi-layer electrode of claim 1, comprising:
determining a total porosity of an electrode material layer;
selecting n binders, wherein n is an integer of 2 or more, having different elastic recovery rates in consideration of the total porosity of the electrode material layer;
mixing the binders with an electrode active material to prepare a first to $n^{th}$ slurries, wherein the binders are selected so that the elastic recovery rate of the binder is sequentially increased from the first slurry constituting the first active material layer closest to the current collector to the $n^{th}$ slurry constituting the $n^{th}$ active material layer farthest from the current collector; and
sequentially applying from the first to the $n^{th}$ slurries onto the current collector, drying, and then rolling to form the first to $n^{th}$ electrode material layers,
wherein the first to $n^{th}$ electrode material layers have a uniform porosity from the first active material layer to the $n^{th}$ active material layer.

12. The preparation method of the multi-layer electrode of claim 11,
wherein each of the slurries further contains a conductive material.

* * * * *